United States Patent [19]

Yamanaka et al.

[11] Patent Number: 5,548,320
[45] Date of Patent: Aug. 20, 1996

[54] LASER DIODE PRINTING APPARATUS

[75] Inventors: Toshihisa Yamanaka; Eiji Okabayashi, both of Machida, Japan

[73] Assignee: Minolta Camera Kabushiki Kaisha, Osaka, Japan

[21] Appl. No.: 125,585

[22] Filed: Sep. 23, 1993

[30] Foreign Application Priority Data

Sep. 28, 1992 [JP] Japan .................................. 4-283817

[51] Int. Cl.⁶ ........................................................ H04N 1/23
[52] U.S. Cl. ............................................................. 547/246
[58] Field of Search .................................. 347/247, 253, 347/246, 240, 236, 131

[56] References Cited

U.S. PATENT DOCUMENTS 4,713,672  12/1987  Horthata et al. .
5,043,745   8/1991  Inoue et al. ............................ 347/246

FOREIGN PATENT DOCUMENTS 58-107693  6/1983  Japan .

Primary Examiner—Mark J. Reinhart
Attorney, Agent, or Firm—Price, Gess & Ubell

[57] ABSTRACT

In the printing apparatus wherein the laser diode is used as light source for writing images on an image carrier, a control transistor is serially connected to the laser diode. The magnitude of the drive current for driving the laser diode is adjusted in accordance with the magnitude of the base current of the control transistor. The base current of the control transistor is turned on when the main power supply is implemented. That is, the control transistor is pre-heated up to print command. Consequently, the drive current is stable from the initial image formation after the main power supply is turned on.

17 Claims, 7 Drawing Sheets

LASER DIODE PRINTING APPARATUS

BACKGROUND OF THE INVENTION

FIELD OF THE INVENTION

The present invention relates to a printing apparatus such as a laser printer, digital copying machine and the like which writes images on an image carrying member using a light source such as a laser diode and the like.

DESCRIPTION OF THE RELATED ART

Conventional printing apparatus using laser diodes as light sources for writing images on image carrying members are generally known to have switching circuits for turning ON and OFF the laser diode in accordance with image data, and transistors (hereinafter referred to as "control transistors") serially connected to said laser diode for controlling the drive current for driving said laser diode when said laser diode is turned ON. The laser diode drive current is controllable by adjusting the signal value applied to the base terminal of said control transistors in the aforesaid circuits.

FIG. 1 is a flow chart showing the image formation control process of a conventional laser printer. When the main power source of a conventional laser printer is turned ON, immediately and directly thereafter the laser diode is switched from the OFF state and maintained at a zero state ($\approx 0$) of signals applied to the base terminal of the control transistor. Accordingly, under the conditions of the aforesaid state, electrical current still is not applied to the control transistor, and the control transistor is maintained in the OFF state.

When a print command is generated (step S1), controls are executed via the automatic power control (APC) mode (step S2). In the automatic power control mode, the drive current applied to the laser diode is adjusted by controlling the signal value applied to the base terminal of the control transistor. When the APC mode ends, the current applied to the base terminal of the control transistor is fixed, such that the image data printing process (step S3) is accomplished by turning ON and OFF the laser diode. That is, when the control transistor enters the ON state, the laser diode is supplied current through the control transistor, and the laser diode emits a laser beam.

In conventional apparatus of the aforesaid type, when the automatic power control (APC) of the laser diode is operable for a short time, the APC ends before the control transistor base and emitter voltages ($V_{BE}$) become stable, such that the drive voltage (or current) becomes fixed. Thereafter, when the base and emitter/voltages $V_{BE}$ change, the drive voltage (or current) of fixed current applied to the laser diode changes greatly, and produces wide variation in image dot size.

SUMMARY OF THE INVENTION

A main object of the present invention is to provide a printing apparatus capable of stable printing operation from the initial image formation after the main power source is turned on.

Another object of the present invention is to provide a printing apparatus capable of always achieving stability before the first image formation operation by operating the control transistor to control the drive current of the laser diode.

These and other objects of the present invention are achieved by providing a printing apparatus comprising:

a means for implementing a main power supply for the printing apparatus;

image carrying member;

light source for writing images on an image carrying member;

control transistors serially connected to said light source to control the magnitude of the current for driving said light source;

switching circuit connected in parallel to said light source to switch said light source;

base current supplying circuit for supplying an electrical current to the base terminal of said control transistors;

control means for controlling said base current supplying circuit to supply an electrical current to the base terminal of said control transistors when the power of the main power supply is turned on.

These and other objects, advantages and features of the invention will become apparent from the following description thereof taken in conjunction with the accompanying drawings which illustrate specific embodiments of the invention.

DESCRIPTION OF THE PREFERRED EMBODIMENTS

The preferred embodiments of the present invention are described hereinafter with reference to the accompanying drawings.

Figure 2:
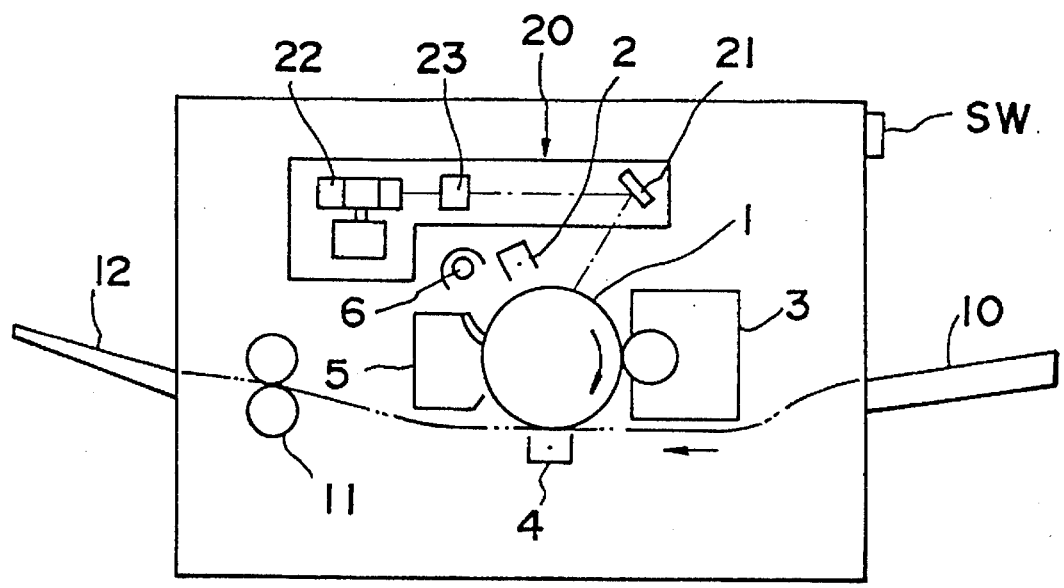
FIG. 2 is a section view of a laser printer.

FIG. 2 briefly shows the construction of a laser printer provided with a rotatable photosensitive drum 1 around the periphery of which are provided a main charger 2, developing device 3, transfer charger 4, cleaner 5, and eraser lamp 6. The surface of the photosensitive drum 1 is charged to a predetermined electric potential via the main charger 2, then exposed by a laser beam emitted from the laser optical unit 20 to form an electrostatic latent image thereon, said electrostatic latent image being developed by the developing device 3 thereafter to form a toner image. The toner image is transferred onto a copy sheet supplied from a cassette 10 via the discharge of transfer charger 4, and fixed on the copy sheet by the fixing device 11. Thereafter, the copy sheet is discharge to the tray 12. On the other hand, when photosensitive drum 1 is again rotated, the residual toner is removed therefrom by the cleaner 5, and the residual charge is eliminated therefrom by the eraser lamp 6. The laser optical unit 20 is provided with a built-in laser diode LD (refer to FIG. 3). The beam emitted from the laser diode LD irradiates the surface of the photosensitive drum 1 via the polygonal mirror 22, fθ lens 23, and reflective mirror 21. In the drawing, SW refers to the switch for turning on the main power source of the apparatus.

Figure 3:
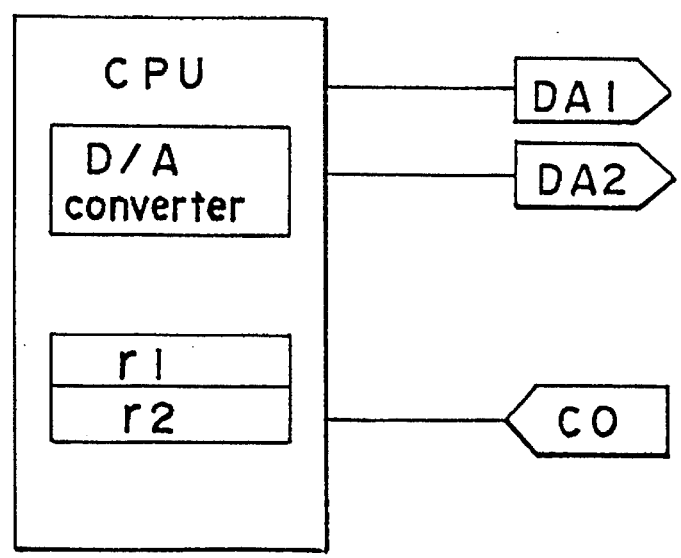
FIG. 3 is an illustration showing the control circuit of the printing apparatus of the present invention.
Figure 4:
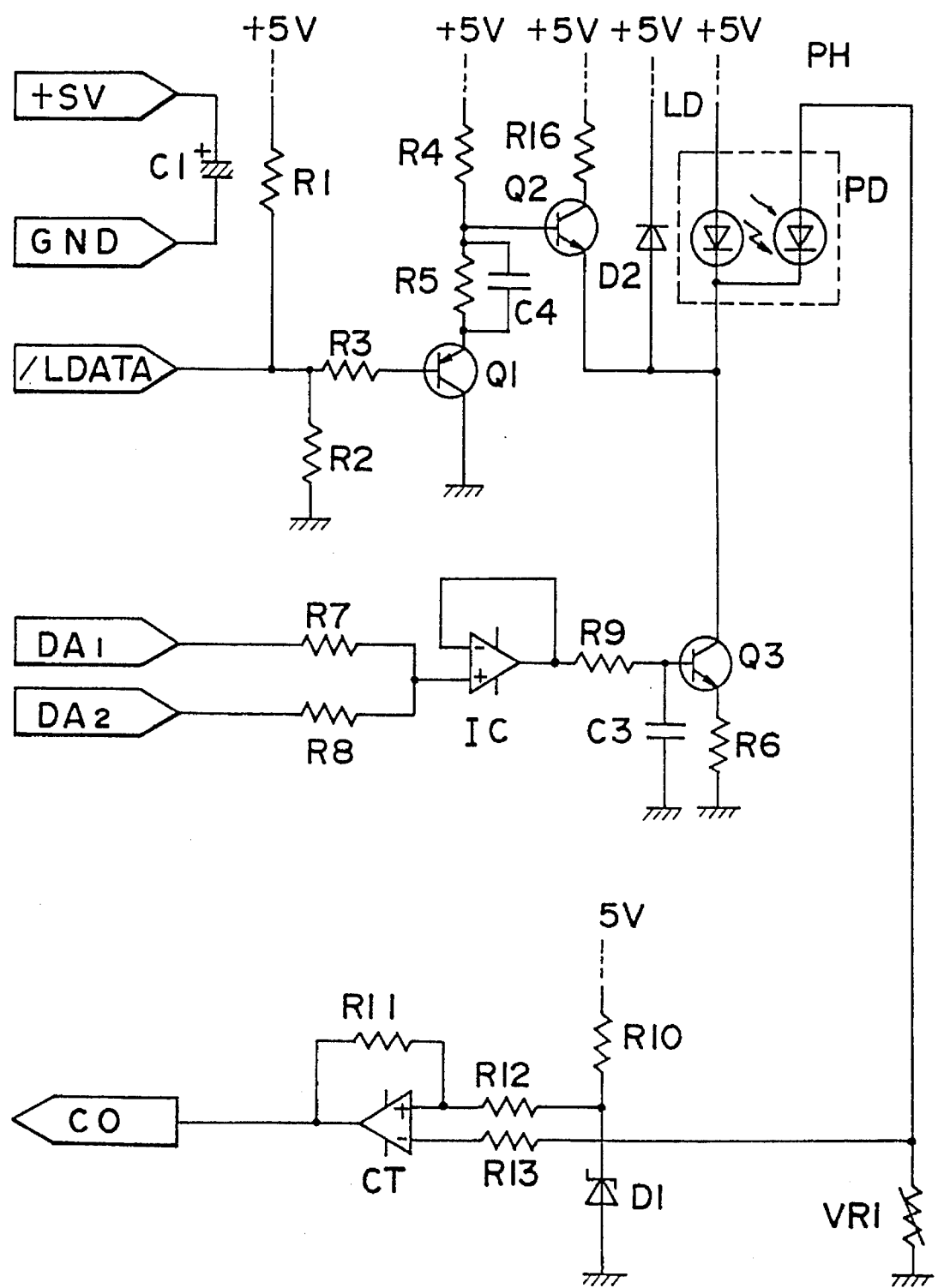
FIG. 4 is an illustration showing the laser diode drive circuit of the present invention.

FIGS. 3 and 4 are illustrations of the control circuit of the printing apparatus of the present invention. In the drawing, PH refers to the print head, and /LDATA refers to the image data signals.

The image data signals/LDATA is binarized in accordance with the image dots to be printed, and is connected to the base terminal of the transistor Q1 via the resistor R3. The signal line is connected to the low-voltage power source (+5 V) via the resistor R1, and is grounded via the resistor R2. A suitable electric potential is maintained by the aforesaid low-voltage power source.

The emitter terminal of the transistor Q1 is connected to the base terminal of the transistor Q2 via a resistor R5, and connected to the low-voltage power source via resistors R4 and R5; the collector terminal is grounded. Accordingly, when the image data signals/LDATA are low-level signals (L), the transistor Q1 is in the ON state (conductive), and when said signals are high level signals (H), the transistor Q1 is in the OFF state (non-conductive). When the transistor Q1 is in the ON state, the transistor Q2 is on the OFF state, whereas, when the transistor Q1 is in the OFF state, the transistor Q2 is in the ON state.

The transistor Q2 is connected to the low-voltage power source and the laser diode LD of the print head PH via parallel connection. The transistor Q2 is further connected to the control transistor Q3 in serial connection with the laser diode LD.

The beam power control signals DA1 and DA2 are output from the CPU and input to the control transistor Q3 base terminal via the resistors R7 and R8, differential amplifier IC, and resistor R9. The control transistor Q3 emitter terminal is connected to the laser diode LD, and the emitter terminal is grounded via the resistor R6. The drive current supplied to the laser diode LD is controlled by controlling the voltage supplied to the base terminal of the control transistor Q3.

The central processing unit (CPU) is provided with a channel digital-analog (D/A) converter (refer to FIG. 3). The count values of the respective internal registers r1 and r2 undergo D/A conversion to generate the beam power control signals DA1 and DA2 which are then output. That is, the CPU increases and decreases the count values of the internal registers r1 and r2 respectively corresponding to the beam power control signals DA1 and DA2, so as to increase or decrease the base-current of the control transistor Q3, and thereby control the drive current supplied to the laser diode LD.

With the control transistor Q3 in the ON state, when an image data signal/LDATA is a low-level signal, the transistor Q2 is in the OFF state and a current is supplied from the low-voltage power source to the laser diode LD via the control transistor Q3, such that the laser diode LD emits a laser beam. At this time, the drive current supplied to the laser diode LD is controlled via base voltage of the control transistor Q3. On the other hand, with the control transistor Q3 is in the ON state, when the image data/LDATA is a high-level signal, the transistor Q2 is turned ON, and a current is supplied from the low-voltage power source to the base via the transistors Q2 and Q3, such that a laser beam is not generated since a drive current is not supplied to the laser diode LD.

The previously mentioned beam power control signal DA1 is used to make coarse adjustment of the drive current supplied to the laser diode LD, and the beam power control signal DA2 is used to make fine adjustment of the drive current supplied to the laser diode LD. In the present embodiment, when the count value of the internal register r1 changes from 1 to 256, the drive current supplied to the laser diode LD fluctuates about 100 mA, whereas when the count value of the internal register r2 changes from 1 to 256, the drive current supplied to the laser diode LD fluctuates about 2 mA.

The initial value of the beam power control signal DA1 is determined in the following manner.

The minimum oscillation starting current of the laser diode LD is set at, for example, 35 mA. Minimization of the output Vo of the differential amplifier IC is such that Vo=1.48 V when the transistor amplification factor $h_{FE}$ of the control transistor Q3 is at a maximum; at that time, $h_{FE}$=390, $V_{BE}$=0.7 V, R6=20 Ω, and R9=910Ω. In order to set the output Vo at 1.48 V, the value of the internal register r1 may be set at [76] in correspondence with the beam power control signal DA1, and the initial value of the internal register r1 is set at [74] to reduce the overflow of the beam power control signal DA2. The two step segments of the beam power control signal DA1 used for coarse adjustment are equivalent to the 97 step segments of the beam power control signal DA2 used for fine adjustment, and the mid-value [128] of the [256] is set as the initial value of the internal register r2 of the beam power control signal DA2 to reduce overflow of said beam power control signal DA2.

The circuit for detecting the emission intensity of the laser diode LD is described hereinafter. The front beam emitted form the front surface of the laser diode LD exposes the surface of the photosensitive drum so as to form an image thereon. On the other hand, the back beam emitted from the back surface of the laser diode LD impinges the PIN photodiode PD. The PIN photodiode PD generates a current corresponding to the intensity of the back beam impinging thereon. The detection current generated by the PIN photo-diode PD is converted to a voltage via the variable resistor VR1, which is supplied to the comparator CT. The comparator CT compares the detection voltage to a reference voltage, and outputs a low level signal CO when the reference voltage is greater than the detection voltage, and outputs a high-level signal CO when the reference voltage of less than the detection voltage. The comparator output signal CO is input to the CPU, and the CPU generates and outputs the beam power control signals DA1 and DA2 via the aforesaid method based on the output signal CO.

Figure 5:
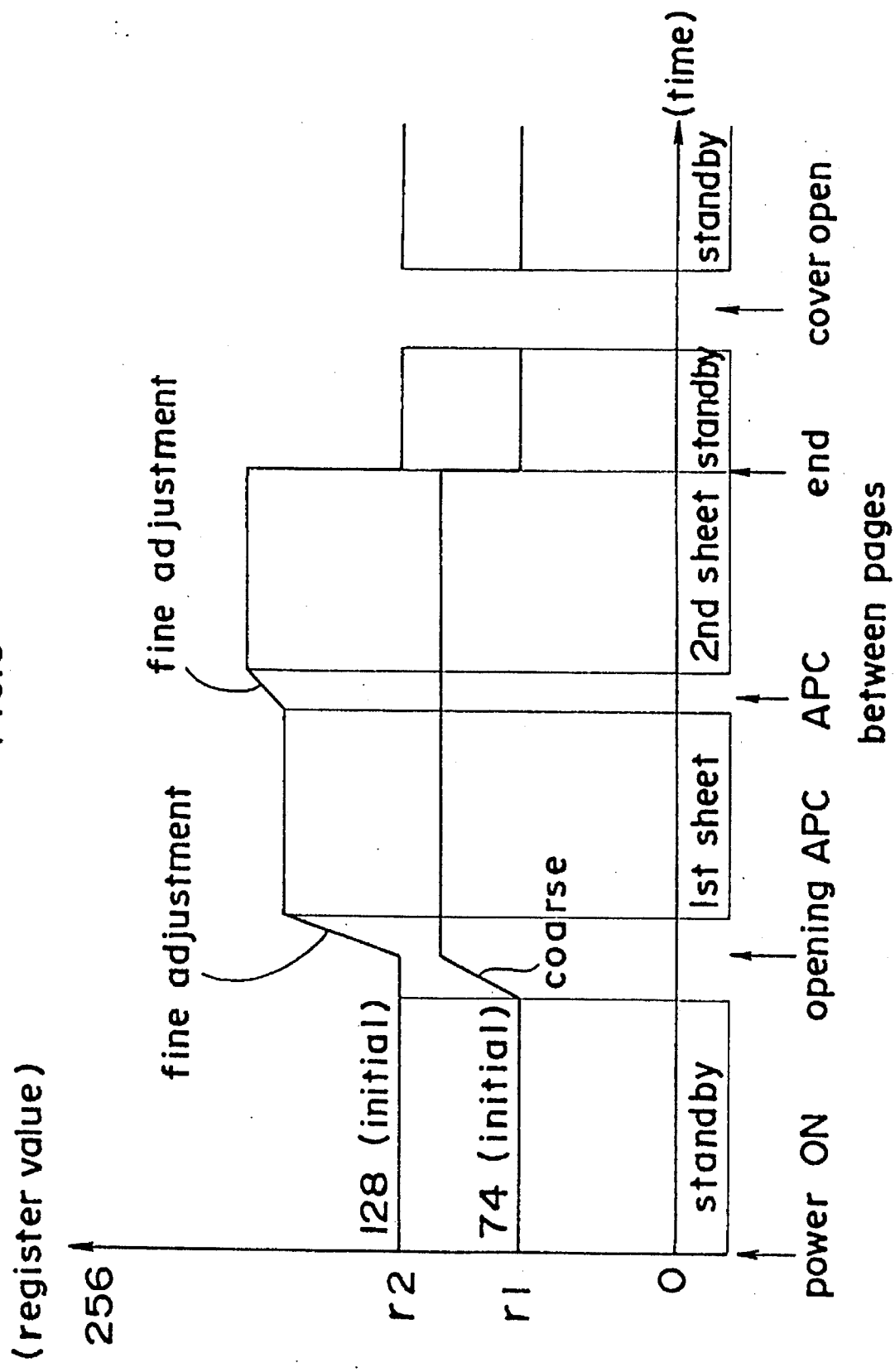
FIG. 5 is a timing chart of the beam power control signals of the printing apparatus of the present invention.

FIG. 5 is a timing chart showing the control timing of the beam power control signals DA1 and DA2.

When the main power source of the printer is turned ON via the operation of the switch SW, the beam power control signal DA1 used for coarse adjustment is set at an initial value of [74], and the beam power control signal DA2 used for fine adjustment is set at an initial value of [128], such that the control transistor Q3 is maintained in the ON state in standby.

When a print command is transmitted from a host computer, the image data signal/LDATA is set at a low-level signal such that the laser diode LD emits a beam, and thereafter the automatic power control is started. Up to this time, current has been supplied to the control transistor Q3, thus ensuring stable operation of said control transistor Q3. When automatic power control is started, the values of the beam power control signals DA1 and DA2 change to accomplish coarse control and fine control of the control transistor Q3 base current (or voltage). Therefore, after the base current is fixed, image data formation starts for a first sheet.

When the image data formation for a first sheet ends, the base current of the control transistor Q3 is finely adjusted via the beam power control signal DA2. At this time, the base current of the control transistor Q3 is not subjected to coarse adjustment via the beam power control signal DA1. The same process is repeated for image data formation of a second sheet. When this image data formation ends, the beam power control signals DA1 and DA2 both return to the standby state.

When the printer cover is opened due to a malfunction or the like, the beam power control signals DA1 and DA2 both are set at zero because the main power source is turned OFF. After the aforesaid malfunction has been repaired and the main power source is again turned ON, the beam power control signals DA1 and DA2 are controlled in processes identical to those previously described.

The operation of the printer of the present invention is described hereinafter with reference to the flow charts of FIGS. 6 and 7.

Figure 1:
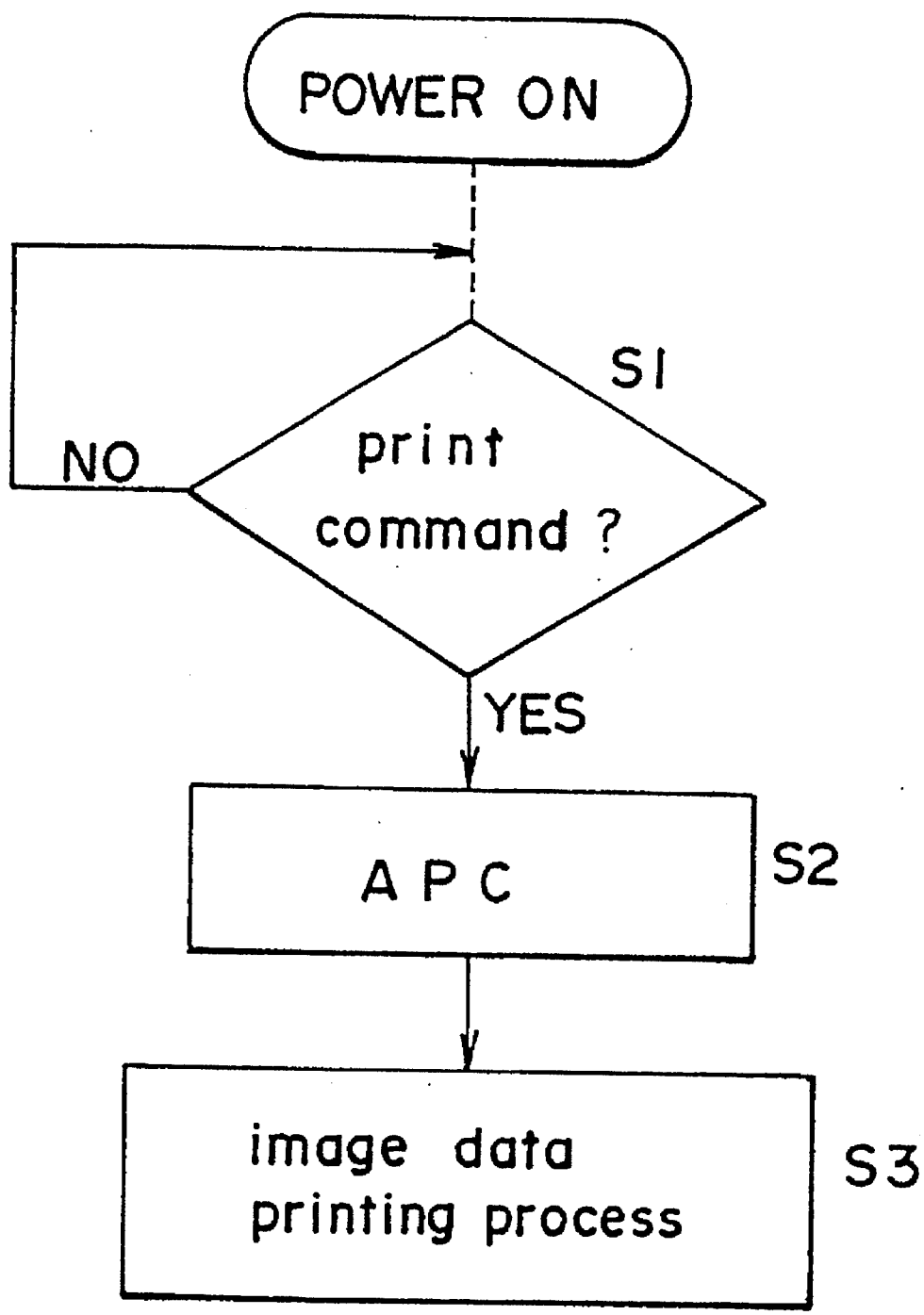
FIG. 1 is a flow chart showing the essential controls of a conventional printing apparatus.
Figure 6:
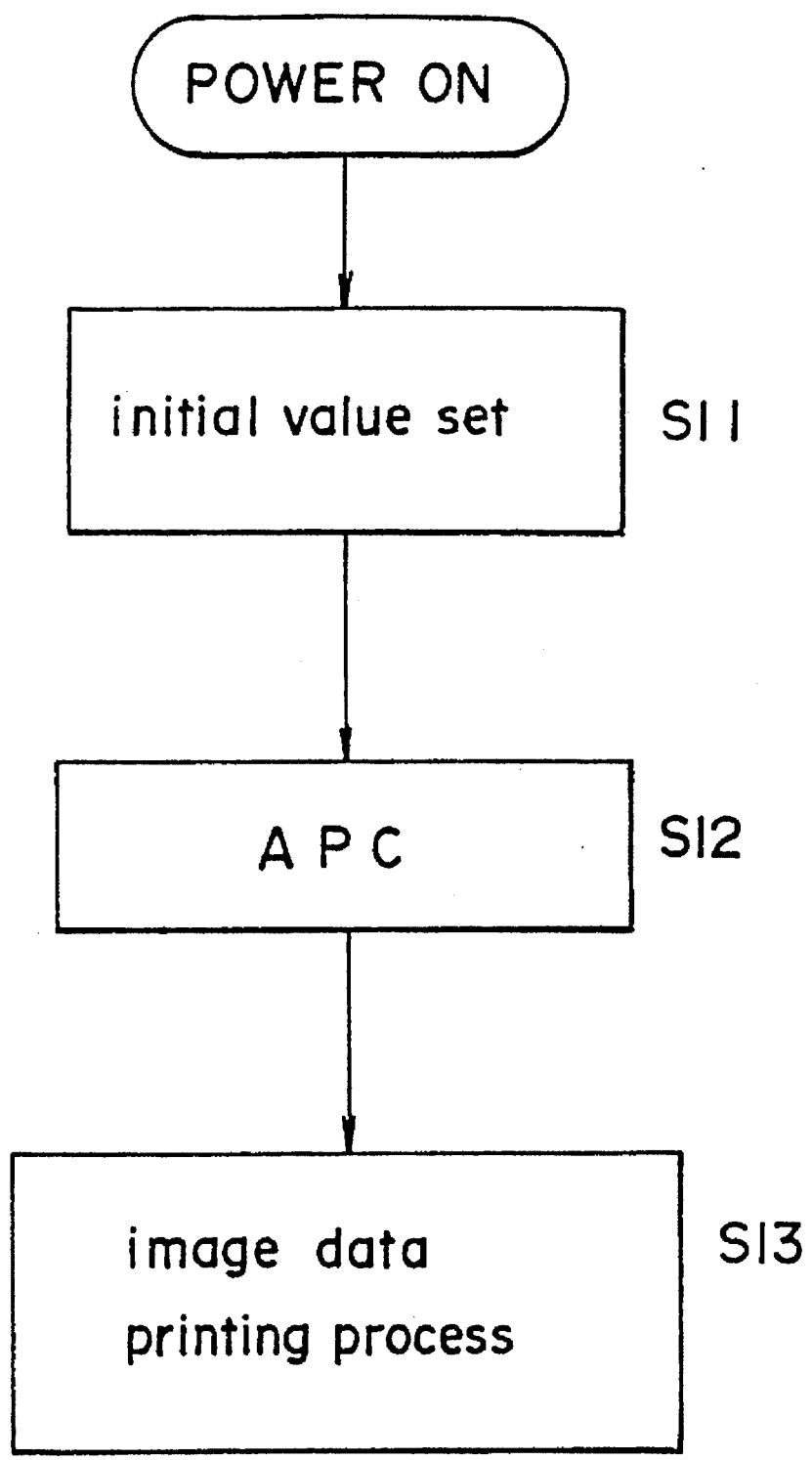
FIG. 6 is a flow chart showing the essential controls of the printing apparatus of the present invention.

As shown in FIG. 6, when the main power source is turned ON, predetermined initial values are set for the beam power control signals DA1 and DA2 (step S11), the control transistor Q3 enters the ON state, and preheating is executed. Then, coarse adjustment and fine adjustment of the control transistor Q3 are executed via the beam power control signals DA1 and DA2, and automatic power control is started (step S12). Thereafter, the operation is identical to that of a conventional laser printer such as shown in FIG. 1, and image formation is accomplished via the ON/OFF control of the image data signals/LDATA (step S13).

Figure 7:
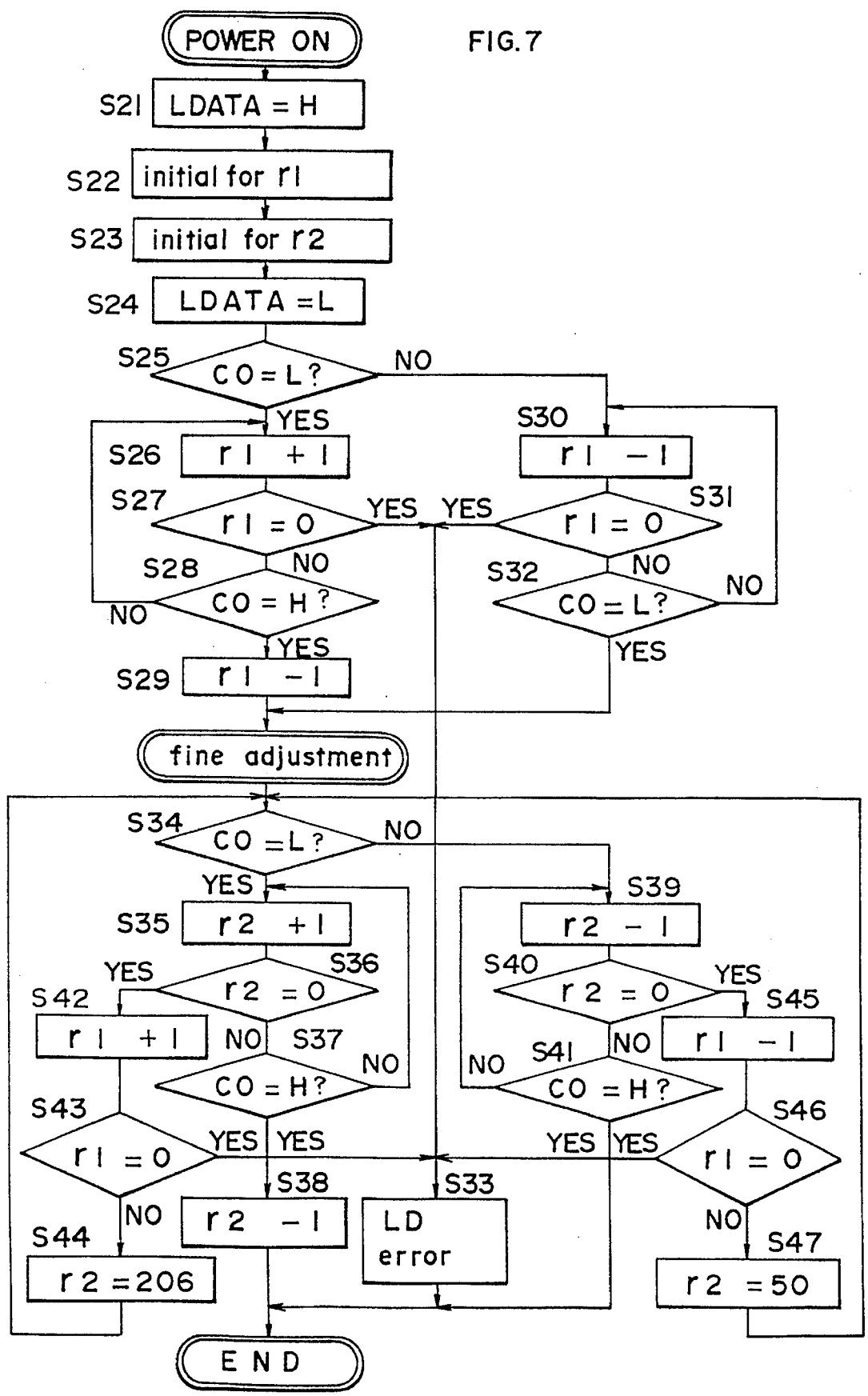
FIG. 7 is a flow chart showing the preheat control of the printing apparatus of the present invention.

FIG. 7 is a flow chart showing details of the coarse adjustment and fine adjustment accomplished by means of the beam power control signals DA1 and DA2 after the main power source is turned ON.

When the main power source is turned ON, the internal registers r1 and r2 are set at initial values. More specifically, an initial value of [74] is set in the internal register r1 corresponding to the beam power control signal DA1 for coarse adjustment, and an initial value of [128] is set in the internal register r2 corresponding to the beam power control signal DA2 for fine adjustment. The image data signal/LDATA is set at high level, and the laser diode LD is set in the OFF state (steps S21, S22, S23). Thus, the beam power control signals DA1 and DA2 are output from the CPU output port in correspondence with the count values of the internal registers r1 and r2, such that the control transistor Q3 is turned ON, and preheating is executed. At this time, however, the laser diode LD still does not emit a beam because the image data signal/LDATA is set at high level.

Then, when a command is transmitted from a host computer, the automatic power control is executed. When the control transistor Q3 is already turned ON when the main power source is turned ON in the manner previously mentioned, the base and emitter voltages ($V_{BE}$) are already in a stable state such that automatic control can start.

Control of the beam power control signals DA1 and DA2 comprise a coarse adjustment process and a subsequent fine adjustment process. The coarse adjustment sets the image data signal/LDATA to low level (step S24), such that the laser diode LD emits a beam. Then, a determination is made as to whether the emission intensity is stronger than or weaker than a target value based on the comparator CT output signal CO (step S25).

When the emission intensity is weaker than a target value (CO=L in step S25), the value of the internal register r1 is incremented (step S26), the beam power control signal DA1 for coarse adjustment is intensified one step, and a determination is made as to whether or not the value of the internal register r1 is zero [0](step S27). When the value of the internal register r1 is not zero, the emission intensity is again determined (step S28). When the emission intensity is found to be still weak, the routine returns to step S26, the value of the internal register r1 is again intensified one step, and the operation is repeated until the beam emission intensity is stronger than a target value. When the beam power exceeds a target value (CO=H in step S28), the value of the internal register r1 is decremented (step S29), and after the beam power control signal for coarse adjustment is weakened one step, the fine adjustment ends.

On the other hand, when the emission intensity is stronger than a target value (CO≠L in step S25), the value of the internal register r1 is sequentially decremented (step S30), and a determination is made as to whether or not the value of said internal register r1 is zero [0] (step S31). When the value of the internal register r1 is not zero, a determination is made as to whether or not the beam power is reduced below a target value (step S32), and the coarse adjustment ends when said beam power is reduced below a target value (CO=L in step S32), and the fine adjustment is started.

When an internal register r1 overflow or underflow is detected via the determinations of steps S27 and S31, a laser diode LD error process is executed (step S33).

In the case of fine adjustment, just as in the case of coarse adjustment, a determination is made as to whether or not the comparator CT output signal CO is a low-level signal (step S34), and when said output signal CO is a low-level signal, the value of the internal register r2 is incremented one by one in correspondence with the beam power control signal DA2 for fine adjustment (step S35), and when the beam power exceeds a target value, the value of the internal register r2 is decremented and the fine adjustment ends (steps S37, S38). In the case wherein the comparator CT output signal CO is a high-level signal (CO≠L in step S34), the internal register r2 value is sequentially decremented in step S39, and when the beam power is reduced below a target value (step S40: YES), fine adjustment ends.

When a register r2 overflow is detected in step S36, the value of the internal register r1 for coarse adjustment is incremented (step S42), and the value of the internal register r2 for fine adjustment is subtracted 48 steps equivalent to one step value of the internal register r1 for coarse adjustment from a maximum value of 256 so as to be set at 206 (step S44), the routine returns to step S34 and the fine adjustment continues. When a register r2 overflow is detected in step S40, the value of the register r1, i.e., the value of the beam power control signal DA1 for coarse adjustment, is decremented (step S45), and the value of the register r2 for fine adjustment is set at 50 steps which is somewhat greater than the 48 steps equivalent one step of the register r1 for coarse adjustment (step S47), the routine returns to step S34 and fine adjustment continues.

When a register r1 overflow or underflow is detected via the determinations in steps S43 and S46, the routine advances to step S33 and the laser diode LD error process is executed.

When the previously described processes end, the value of the registers r1 and r2 at this time are held, and one page is printed.

The aforesaid series of processes illustrate the beam power controls executed after the main power source is turned ON and before the one page print process is executed. As shown in the timing chart of FIG. 5, the beam power fine adjustment is executed only between pages, and, during standby between printing operations, or during standby after a jam or error process, the predetermined values are set for the internal registers r1 and r2 to turn ON the control transistor Q3 and preheat said control transistor Q3 to stabilize the voltage $V_{BE}$ between the base and emitter.

The base current (preheat current) $I_0$ of the control transistor Q3 is set at least so as to satisfy the Equation (1) below, wherein the characteristics function including circuit characteristics, transistor characteristics, and laser characteristics is designated f(x) [that is, x(%): permissible light fluctuation ratio].

$$I_0 \geq f(x) \qquad (1)$$

Equation (1) is more specifically expressed via Equation (2) below, wherein

K: laser diode characteristics constant
L: transistor characteristics constant
M: circuit characteristics constant
n: integer greater than 1.

$$I_0 \geq K(1-x \cdot K \cdot L \cdot M) \qquad (2)$$

When the integer n in Eq. (2) is equal to [1], the following Equation (3) replaces Eq. (2).

$$I_0 \geq K(1-x \cdot K \cdot L \cdot M) \qquad (3)$$

In the present embodiment, the preheat current $I_0$ in Equation (4), wherein

P1: laser diode LD emission light quantity
η: differentiation efficiency
k: $V_{BE}$ variation constant
l: temperature variation constant.

$$I_0 = \frac{P_1}{n}\left(1 - \frac{x}{100} \cdot \frac{P_1}{\eta} \cdot \frac{R6 + R9/h_{FE}}{k \cdot l}\right) \qquad (4)$$

Specifics of the process for determining Eq. (4) are described below.

Figure 8:
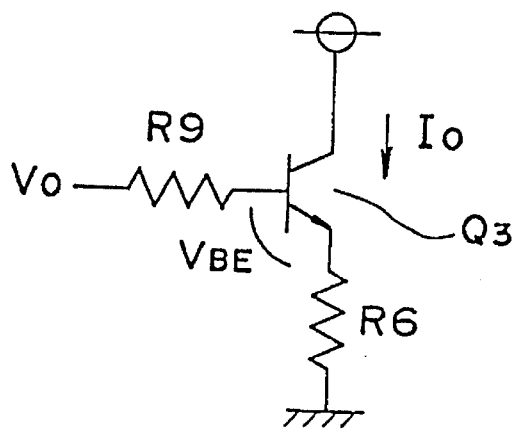
FIGS. 8(a), 8(b), and 8(c) are illustrations of the control transistor.
Figure 8:
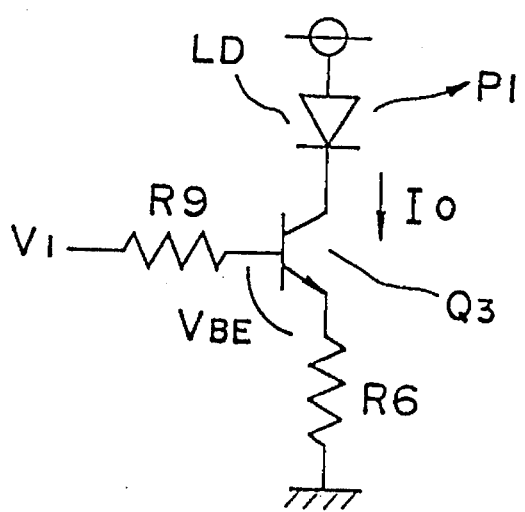
Figure 8:
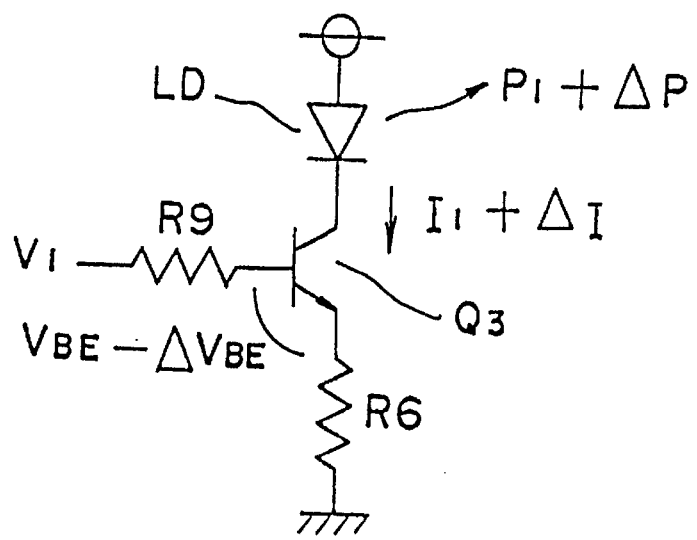

During preheating of the control transistor Q3, the preheating current conditions wherein the variation rate of the emission light quantity P1 is less than the permissible variation rate x% is expressed by Equation (5) below, wherein the control transistor Q3 amplification factor is designated $h_{FE}$, voltage between base and emitter is designated $V_{BE}$ (V), laser diode LD light emission quantity is designated $P_1$ (mW), amount of variation of-emission quantity $P_1$ is designated $\Delta P$ (mW), and differentiation efficiency is designated n (mW/A), as shown in FIG. 8a.

$$\frac{\Delta P}{P_1} \geq \frac{x}{100} \qquad (5)$$

When the expression $\Delta P = \eta \cdot \Delta I$ is substituted for $\Delta P$ of Eq. (5), Equation (6) is derived.

$$\frac{\eta}{P_1} \Delta I \leq \frac{x}{100} \qquad (6)$$

When the values shown in FIG. 8b are used, the current $I_1$ during automatic power control is expressed by Equation (7).

$$I_1 = \frac{V_1 - V_{BE}}{R6 + R9/h_{FE}} \qquad (7)$$

During continuous emission after automatic adjustment is started, the current variation amount $\Delta I$ is expressed by Equation (8), as shown in FIG. 8c.

$$\Delta I = \frac{\Delta V_{BE}}{R6 + R9/h_{FE}} \qquad (8)$$

When Eq. (8) is substituted in Eq. (6), the following Equation (9) is derived.

$$\frac{\eta}{P_1} \cdot \frac{\Delta V_{BE}}{R6 + R9/H_{FE}} \leq \frac{x}{100} \qquad (9)$$

The relationship between the amount of change $V_{BE}$ between the base-emitter voltages and the is expressed via Equation (10) using the variation constant (V/°C.) of the voltage $V_{BE}$ between base and emitter.

$$\Delta V_{BE} = k \cdot \Delta T \qquad (10)$$

When Eq. (10) is substituted in Eq. (9), the following Equation (11) is derived.

$$\frac{\eta}{P_1} \cdot \frac{k}{R6 + R9/h_{FE}} \cdot \Delta T \leq \frac{x}{100} \qquad (11)$$

The relationships among the change in temperature $\Delta T$ and the aforesaid currents $I_1$ and $I_0$ are expressed in Equation (12) using the temperature variation constant 1 (°C./A) relative to the units of current.

When Eq. (12) is substituted in Eq. (11), the following Equation (13) is derived.

$$\Delta T = l \cdot \frac{I_1 - I_0}{I_1} \qquad (12)$$

$$\frac{\eta}{P_1} \cdot \frac{k \cdot l}{R6 + R9/h_{FE}} \cdot \frac{I_1 - I_0}{I_1} \leq \frac{x}{100} \qquad (13)$$

If the expression $I_1 = P_1/\eta$ is substituted in the Eq. (13), the following Equation (14) is derived.

$$\left(\frac{\eta}{P_1}\right)^2 \cdot \frac{K \cdot l}{R6 + R9/h_{FE}} \cdot \left(\frac{P_1}{\eta} - I_0\right) \leq \frac{x}{100} \qquad (14)$$

If Eq. (14) is rearranged relative to $I_0$, the previously mentioned Eq. (4) is derived.

When the values shown in Table 1 are applied, the preheating current conditions are such that $I_0 \geq 9.4$ (mA).

| LD emission $P_1$ | 3 (mW) | Permissible light variation factor x | 10% |
| Differentiation Factor η | 300 (mW/A) | $V_{BE}$ variation constant k | 0.002 (V/°C.) |
| Resistance R6 | 20 Ohms | temperature change constant l | 200 (°C./A) |
| Resistance R9 | 910 Ohms | amplification factor $h_{FE}$ | 240 |

Although a laser diode is used in the embodiment described above, it is to be noted that other photodiodes may be alternatively used.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A printing apparatus comprising:
   means for implementing a main power supply for the printing apparatus;

an image carrying member;

a light source which emits a light beam;

a control transistor which is serially connected to said light source to control the magnitude of the current for driving said light source so as to control the intensity of the light beam;

a switching circuit which is connected in parallel to said light source and switches said light source in accordance with image data to form an image on said image carrying member;

a base current supplying circuit for supplying an electrical current to the base terminal of said control transistor; and control means for controlling said base current supplying circuit to supply an electrical current to the base terminal of said control transistor in response to implementation of the main power supply, so as to heat the control transistor prior to an image forming operation.

2. A printing apparatus as claimed in claim 1 wherein said switching circuit turns said light source off when the power of the main power supply is turned on.

3. A printing apparatus as claimed in claim 1, further comprising means for controlling said switching circuit in accordance with image data.

4. A printing apparatus as claimed in claim 1 wherein said switching circuit includes a transistor serially connected to said control transistor.

5. A printing apparatus as claimed in claim 1, further comprising a sensor for detecting the intensity of the light emitted by said light source and for outputting signals corresponding to the detected intensity.

6. A printing apparatus as claimed in claim 5 wherein said control means controls the magnitude of the current supplied to the base terminal in accordance with the output signal from said sensor.

7. A printing apparatus as claimed in claim 1 wherein said light source includes a laser diode.

8. A printing apparatus, comprising:

means for implementing a main power supply for the printing apparatus;

an image carrying member;

a light source which emits a light beam to form an image on said image carrying member;

a control transistor for controlling the magnitude of the current for driving said light source, the collector terminal thereof being serially connected to said light source;

storage means for storing digital signals;

a digital-to-analog converter for converting the digital signal stored in said storage means to analog signals;

a circuit for supplying the analog signal output from said digital-to-analog converter to the base terminal of said control transistor; and means for writing an initial value not equal to zero in said storage means in response to implementation of the main power supply, so as to heat the control transistor prior to an image forming operation.

9. A printing apparatus as claimed in claim 8, further comprising:

sensor for detecting the intensity of the light emitted by said laser diode, and for outputting signals corresponding to the detected intensity; and means for changing the digital signal stored in said storage means in accordance with the output signal of said sensor.

10. A printing apparatus as claimed in claim 8 wherein the initial value is substantially equivalent to a mid-value in the range of the digital signal stored in said storage means.

11. A printing apparatus as claimed in claim 8, further comprising a switching circuit said light source to form an image.

12. A printing apparatus as claimed in claim 11, further comprising means for controlling said switching circuit so as to turn said light source off when the power of the main power supply is off.

13. A printing apparatus as claimed in claim 1, further comprising means for controlling said switching circuit according to image data.

14. A printing apparatus as claimed in claim 11 wherein said switching circuit includes transistors serially connected to said control transistor and in parallel to said light source.

15. An image intensity control apparatus comprising:

means for implementing a main power supply for the printing apparatus;

an image carrying member;

a light source which emits a light beam to form an image on said image carrying member;

a sensor for detecting the intensity of the light emitted by said light source and for outputting signals corresponding to the detected intensity;

a circuit for supplying the current to said laser diode;

a first transistor having its collector terminal serially connected to said light source;

base current adjusting means for adjusting the base current of said first transistor in accordance with an output signal of said sensor;

a second transistor connected serially to said first transistor and in parallel to said light source;

means for switching the base current of said second transistor in accordance with image data; and means for supplying a predetermined current to the base terminal of said first transistor in response to the implementation of the main power supply, so as to heat the control transistor prior to an image forming operation.

16. A printing apparatus as claimed in claim 5 wherein said light source includes a laser diode, and further including means for providing a first coarse adjustment of a power output of the laser diode and a second fine adjustment of the power output of the laser diode in response to detected intensity output signals.

17. A printing apparatus as claimed in claim 16 wherein the second fine adjustment is only performed when the switching circuit is not activated in response to image data.

* * * * *